US011758366B2

(12) United States Patent
Zhang et al.

(10) Patent No.: US 11,758,366 B2
(45) Date of Patent: *Sep. 12, 2023

(54) METHODS AND DEVICES FOR DISPLAYING A HEAT MAP AND PROVIDING HEAT DATA

(71) Applicant: BEIJING DIDI INFINITY TECHNOLOGY AND DEVELOPMENT CO., LTD., Beijing (CN)

(72) Inventors: Wentao Zhang, Beijing (CN); Bo Zhang, Beijing (CN); Weijun Xie, Hangzhou (CN); Jiayi Shen, Hangzhou (CN)

(73) Assignee: Beijing DiDi Infinity Technology & Development Co., Ltd., Beijing (CN)

( * ) Notice: Subject to any disclaimer, the term of this patent is extended or adjusted under 35 U.S.C. 154(b) by 11 days.

This patent is subject to a terminal disclaimer.

(21) Appl. No.: 17/468,555

(22) Filed: Sep. 7, 2021

(65) Prior Publication Data
US 2021/0409907 A1 Dec. 30, 2021

Related U.S. Application Data

(63) Continuation of application No. 17/131,595, filed on Dec. 22, 2020, now Pat. No. 11,140,520, which is a
(Continued)

(30) Foreign Application Priority Data
Mar. 14, 2019 (CN) .......................... 201910195038.1

(51) Int. Cl.
*H04W 4/00* (2018.01)
*H04W 4/029* (2018.01)
(Continued)

(52) U.S. Cl.
CPC ........ *H04W 4/029* (2018.02); *G01C 21/3438* (2013.01); *G06F 16/287* (2019.01); *G06F 16/29* (2019.01); *G06Q 50/30* (2013.01)

(58) Field of Classification Search
CPC ...... H04W 4/029; G06F 16/287; G06F 16/29; G01C 21/3438; G06Q 50/30
See application file for complete search history.

(56) References Cited

U.S. PATENT DOCUMENTS 10,664,570 B1 * 5/2020 Clark ..................... G16H 40/63
10,740,891 B1   8/2020 Chen et al.
(Continued)

FOREIGN PATENT DOCUMENTS

CN   104239617 A   12/2014
CN   104899368 A    9/2015
(Continued)

OTHER PUBLICATIONS

PCT International Search Report and the Written Opinion dated Dec. 19, 2019, issued in related International Application No. PCT/CN2019/088476 (8 pages).
(Continued)

*Primary Examiner* — Khai M Nguyen
(74) *Attorney, Agent, or Firm* — Sheppard Mullin Richter & Hampton LLP

(57) ABSTRACT

Methods, systems, and apparatus, including computer programs encoded on computer storage media, for a computer-implemented method for displaying a heat map are provided. One of the methods includes: receiving heat data from a server, wherein the heat data comprises a color value associated with each of a plurality of regions and one or more geographic locations respectively corresponding to one or more boundary points of each of one or more heat regions among the plurality of regions; generating a first
(Continued)

heat map comprising a plurality of pixels; obtaining a second heat map by adjusting the color value of each pixel in the first heat map; and providing the second heat map for display, wherein the second heat is superimposed on a digital map. This method addresses the issue of conventional techniques that service request information may be misrepresented due to abrupt changes in color values across neighboring heat regions.

18 Claims, 9 Drawing Sheets

Related U.S. Application Data continuation of application No. PCT/CN2019/088476, filed on May 27, 2019.

(51) Int. Cl.
　　*G06F 16/28* (2019.01)
　　*G06F 16/29* (2019.01)
　　*G01C 21/34* (2006.01)
　　*G06Q 50/30* (2012.01)

(56) References Cited

U.S. PATENT DOCUMENTS

| | | | |
|---|---|---|---|
| 11,140,520 B2* | 10/2021 | Zhang | G01C 21/3438 |
| 2013/0332068 A1 | 12/2013 | Kesar et al. | |
| 2015/0070383 A1* | 3/2015 | Da Veiga | G06F 16/29 345/629 |
| 2018/0017406 A1 | 1/2018 | Semnani et al. | |
| 2018/0184062 A1 | 6/2018 | Hariri | |
| 2018/0268049 A1 | 9/2018 | Youssefian | |
| 2019/0180480 A1 | 6/2019 | Gao et al. | |
| 2019/0204091 A1 | 7/2019 | Williams et al. | |
| 2020/0013102 A1 | 1/2020 | Yeldham | |
| 2020/0120170 A1 | 4/2020 | Amitay et al. | |
| 2020/0160571 A1* | 5/2020 | Burrows | G01C 21/3682 |

FOREIGN PATENT DOCUMENTS

| | | | |
|---|---|---|---|
| CN | 105741334 A | 7/2016 | |
| CN | 105844681 A | 8/2016 | |
| CN | 106570917 A | 4/2017 | |
| CN | 107766375 A | 3/2018 | |
| CN | 107944618 A | 4/2018 | |
| CN | 109213949 A | 1/2019 | |
| CN | 109241466 A | 1/2019 | |
| WO | 2016/135536 A1 | 9/2016 | |
| WO | WO-2016135536 A1 * | 9/2016 | G06F 17/00 |

OTHER PUBLICATIONS

Non-Final Office Action dated Mar. 2, 2021, issued in related U.S. Appl. No. 17/131,595 (10 pages).

Notice of Allowance dated Jun. 4, 2021, issued in related U.S. Appl. No. 17/131,595 (9 pages).

First Office Action and Search Report dated May 20, 2023, issued in related Chinese Application No. 201910195038.1 (11 pages).

* cited by examiner

METHODS AND DEVICES FOR DISPLAYING A HEAT MAP AND PROVIDING HEAT DATA

CROSS REFERENCE TO RELATED APPLICATIONS

This application is a continuation of U.S. patent application Ser. No. 17/131,595, filed Dec. 22, 2020, and titled "Methods and Devices for Displaying a Heat Map and Providing Heat Data," which is a continuation of International Application No. PCT/CN2019/088476, filed May 27, 2019, and titled "Methods and Devices for Displaying a Heat Map and Providing Heat Data," which claims priority to and benefits of Chinese Patent Application No. 201910195038.1, filed with the State Intellectual Property Office (SIPO) of the People's Republic of China on Mar. 14, 2019, and entitled "A HEAT-MAP-DISPLAY AND HEAT-DATA-NOTIFICATION METHOD AND DEVICE." The entirety of the aforementioned applications are incorporated herein by reference.

TECHNICAL FIELD

This application relates generally to computer science, and more specifically, to methods and devices for displaying a heat map and providing heat data.

BACKGROUND

A ride-hailing platform can automatically connect users requesting transportation services ("service requesters") with users providing transportation services ("service providers"). Each service requester or passenger pays for using the transportation services, while each service provider or vehicle driver receives compensation for providing the transportation services. A service provider may use a mobile terminal to communicate with the ride-hailing platform and one or more terminals associated with one or more service requesters.

A heat map may be a map having one or more regions of different color values. These regions may overlap with the map, and each color value may reflect a heat value that represents information (such as distribution, density, trend of change, etc.) of an item of interest within the region. Each region in a heat map may have a pre-defined shape such as a hexagonal shape and may be displayed independently. For example, in two adjacent geographic regions of A and B, a heat value in region A may be much higher (e.g., higher by n levels) than that in region B, thus these two regions' heat values may be significantly different (e.g., different by n levels). However, in reality, the heat values in adjacent boundary areas of regions A and B may be similar. Thus, for a conventional heat map, it can be difficult to accurately reflect the information about the item of interest in boundary areas of different regions.

In some applications, a heat map may represent distribution of communications associated with a service in various geographic regions. For example, such a heat map may represent distribution of services requests for transportation services in the case of a ride-hailing service. Using a conventional heat map, it can be difficult to accurately reflect actual distribution of service requests in boundary areas of neighboring heat regions. Wrong instructions regarding distribution of service requests may be sent due to inaccurate information the heat map conveys. For example, in two adjacent geographic regions of A and B, the overall service requests in region A may be much higher than that in region B, thus these two regions' heat values may be significantly different. However, in reality, the distribution of service requests in a boundary area included in region A and an adjacent boundary area included in region B may be similar. Actual service requests in the boundary areas may be misrepresented. As a result, for example, when a driver enters a target heat region marked by a darker color (e.g., a darker color may indicate a surplus of service resources) to seek a service order, the driver may be assigned a service order at a boundary area that does not have a surplus of service resources but happens to be included within the target heat region. The driver may not be able to get a desirable service order that is helpful to relieve the surplus of service resources (e.g., service requests) in the target heat region.

SUMMARY

Various embodiments of the present disclosure can include systems, methods, and non-transitory computer readable media for exchange and synchronization of status information of a heat map displaying method or a heat data providing method.

In view of the limitations of conventional techniques described above, a computer-implemented method for displaying heat map, a computer-implemented method for providing heat data, and related devices are presented to address at least some limitations of conventional techniques.

This specification first presents a computer-implemented method for displaying a heat map. This method may include receiving heat data from a server. The heat data may include a color value associated with each of a plurality of regions and one or more geographic locations respectively corresponding to one or more boundary points of each of one or more heat regions among the plurality of regions. The method may also include generating, based on the heat data, a first heat map including a plurality of pixels corresponding to each of the regions, where the pixels each has the color value associated with the region, and obtaining a second heat map by adjusting the color value of each pixel in the first heat map based on the color value and a weight associated with each of a plurality of neighboring pixels in a neighborhood region centered on the pixel. The method may further include providing the second heat map for display, where the second heat map is superimposed on a digital map.

In some embodiments, the heat data may further include a plurality of heat label sets. Each of the heat label sets may correspond to one of a plurality of zoom levels. Each of the heat label sets may include one or more heat labels. Each of the one or more heat labels may indicate a heat value associated with a corresponding heat region.

In some embodiments, the aforementioned method for displaying a heat map may further include identifying a current zoom level of the digital map, identifying a heat label set corresponding to the current zoom level, and providing the heat labels in the identified heat label set for display on the digital map.

In some embodiments, the aforementioned method for displaying a heat map may further include detecting an updated current zoom level, and providing, for display on the digital map, the heat labels in a heat label set corresponding to the updated current zoom level.

In some embodiments, in the aforementioned method for displaying a heat map, the generating the first heat map may include determining a canvas size based on the geographic locations corresponding to the boundary points of the one or more heat regions and one or more preset margins, generating a canvas of the canvas size, and converting each of the geographic locations to coordinates on the canvas.

In some embodiments, the generating the first heat map may further include mapping each of the heat regions on the canvas based on the coordinates of the boundary points of the heat regions and generating the first heat map by rendering each of the heat regions based on the color value associated with the heat region.

In some embodiments, in the aforementioned method for displaying a heat map, the adjusting the color value of each pixel may include, for each neighboring pixel in the neighborhood region centered on the pixel, obtaining a current color value by multiplying the color value of the neighboring pixel with the weight associated with the neighboring pixel, and setting the color value of the pixel as a sum of the current color values of all the neighboring pixels in the neighborhood region.

This specification further provides a computer-implemented method for providing heat data. This method may include determining a heat value associated with each of a plurality of regions based on service information associated with the region and obtaining one or more heat regions by identifying one or more of the regions having heat values greater than a threshold and merging one or more sets of the identified regions. Each set may include two or more of the identified regions that are adjacent to each other and have heat values within a same range.

In some embodiments, the method for providing heat data may further include determining heat data associated with each of the heat regions and sending the heat data to a client. The heat data may include one or more geographic locations respectively corresponding to one or more boundary points of the heat region, a heat value associated with the heat region, and a color value corresponding to the heat value.

In some embodiments, the determining heat data associated with each of the heat regions may include setting longitude and latitude coordinates associated with a boundary of the heat region in a plurality of directions as the geographic positions respectively corresponding to the boundary points of the heat region, and, if the heat region is obtained by merging a set of the identified regions, setting the heat value of the heat region as a weighted sum of the heat values of the identified regions in the set.

In some embodiments, the determining heat data associated with each of the heat regions may include generating a plurality of heat labels each corresponding to one of the heat regions and indicating the heat value of the corresponding heat region, and determining a plurality of heat label sets, each including one or more of the heat labels and corresponding to one of a plurality of zoom levels.

In some embodiments, the sending the heat data to a client may include determining a service status of the client, and sending the heat data to the client after each time interval of a preset length if the service status is a standby status or sending the heat data to the client immediately if the service status of the client is changed from an order-completed status to the standby status.

In some embodiments, the determining a heat value associated with each of a plurality of regions may include determining the heat value based on a number of service-requesting terminals and a number of service-providing terminals within the region. The heat value may indicate a distribution of service resources within the region.

This specification further provides a system for displaying a heat map. The system may include a processor and a non-transitory computer-readable storage medium storing instructions. The instructions may be executed by the processor to cause the system to perform operations. The operations may include receiving heat data from a server. The heat data may include a color value associated with each of a plurality of regions and one or more geographic locations respectively corresponding to one or more boundary points of each of one or more heat regions among the plurality of regions. The operations may also include generating, based on the heat data, a first heat map include a plurality of pixels corresponding to each of the regions, wherein the pixels each has the color value associated with the region, and obtaining a second heat map by adjusting the color value of each pixel in the first heat map based on the color value and a weight associated with each of a plurality of neighboring pixels in a neighborhood region centered on the pixel. The operations may further include providing the second heat map for display, where the second heat map is superimposed on a digital map.

This specification further provides a system for providing heat data. The system may comprise a processor and a non-transitory computer-readable storage medium storing instructions. The instructions may be executed by the processor to cause the system to perform operations. The operations may include determining a heat value associated with each of a plurality of regions based on service information associated with the region and obtaining one or more heat regions by identifying one or more of the regions having heat values greater than a threshold and merging one or more sets of the identified regions. Each set comprises two or more of the identified regions that are adjacent to each other and have heat values within a same range. The operations may also include determining heat data associated with each of the heat regions. The heat data may comprise one or more geographic locations respectively corresponding to one or more boundary points of the heat region, a heat value associated with the heat region, and a color value corresponding to the heat value. The operations may further include sending the heat data to a client.

In some embodiments, the specification provides a non-transitory computer-readable storage medium for displaying a heat map. The non-transitory computer-readable storage medium may be configured with instructions executable by one or more processors to cause the one or more processors to perform operations. The operations may include receiving heat data from a server. The heat data may include a color value associated with each of a plurality of regions and one or more geographic locations respectively corresponding to one or more boundary points of each of one or more heat regions among the plurality of regions. The operations may also include generating, based on the heat data, a first heat map include a plurality of pixels corresponding to each of the regions, wherein the pixels each has the color value associated with the region, and obtaining a second heat map by adjusting the color value of each pixel in the first heat map based on the color value and a weight associated with each of a plurality of neighboring pixels in a neighborhood region centered on the pixel. The operations may further include providing the second heat map for display, where the second heat map is superimposed on a digital map.

In some embodiments, the specification provides a non-transitory computer-readable storage medium for providing heat data. The non-transitory computer-readable storage medium may be configured with instructions executable by one or more processors to cause the one or more processors to perform operations. The operations may include determining a heat value associated with each of a plurality of regions based on service information associated with the region and obtaining one or more heat regions by identifying one or more of the regions having heat values greater than a threshold and merging one or more sets of the identified regions. Each set comprises two or more of the identified regions that are adjacent to each other and have heat values within a same range. The operations may also include determining heat data associated with each of the heat regions. The heat data may comprise one or more geographic locations respectively corresponding to one or more boundary points of the heat region, a heat value associated with the heat region, and a color value corresponding to the heat value. The operations may further include sending the heat data to a client.

In some embodiments, a server may send heat data to a client, so that the client can generate a heat map based on the heat data. To facilitate the processing of the heat data on the client, the heat data may be pre-processed on the server. More specifically, after heat values for each of the regions are determined based on the service information, the server may identify the regions that have heat values higher than a threshold (the identified regions are named heat regions). Some of these identified regions may further be merged into a merged region if these regions are adjacent to each other and their heat values are within a certain range. The geographic positions of boundary points of the identified regions, as well as color values corresponding to each of the identified regions are sent to the client.

In some embodiments, a client may receive heat data from a server, and generate a first heat map based on the geographic positions of the boundary points, and color values of each of a plurality of heat regions in the heat data. Based on the first heat map, a second heat map may be generated by adjusting color value for each pixel in the first heat map. The adjustment of color value for each pixel in the first heat map may include, for each neighboring pixel in the neighborhood region centered on the pixel, obtaining a current color value by multiplying the color value of the neighboring pixel with a weight associated with the neighboring pixel and setting the color value of the pixel as a sum of the current color values of all the neighboring pixels in the neighborhood region. A pixel's neighboring pixels may refer to pixels in a neighborhood region centered on that pixel, and a neighborhood region may refer to a region, such as a 3×3 region, surrounding the pixel. After the second heat map is computed, the second heat map may be superimposed to a digital map for display.

In the methods and systems disclosed herein, by adjusting the color value for each pixel in the first heat map, boundary characteristics of the heat regions may be smoothed. The heat regions in the second heat map may have more blurred edges than their counterparts in the first heat map, thus information of interest may be more accurately represented. This method addresses the issues of conventional techniques that service information may be misrepresented due to abrupt changes in color values across neighboring heat regions.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

Embodiments of this application will be described in detail below with reference to the accompanying drawings to fully illustrate the purposes, characteristics and advantages of the aforementioned methods and devices.

BRIEF DESCRIPTION OF THE DRAWINGS

Preferred and non-limiting embodiments of the invention may be more readily understood by referring to the accompanying drawings in which.

DETAILED DESCRIPTION

Specific, non-limiting embodiments of the present invention will now be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

Some embodiments provide a heat map displaying method and related device. In this heat map displaying method, a color value for each pixel in an original heat map may be adjusted, so that the boundary characteristics of the regions in the heat map can be smoothed. The regions in the processed heat map may have blurred edges, and the color values at the heat map may change more smoothly than those in the original heat map. That allows information (such as distribution, density, rate of change) be more accurately represented than using conventional techniques.

Figure 1:
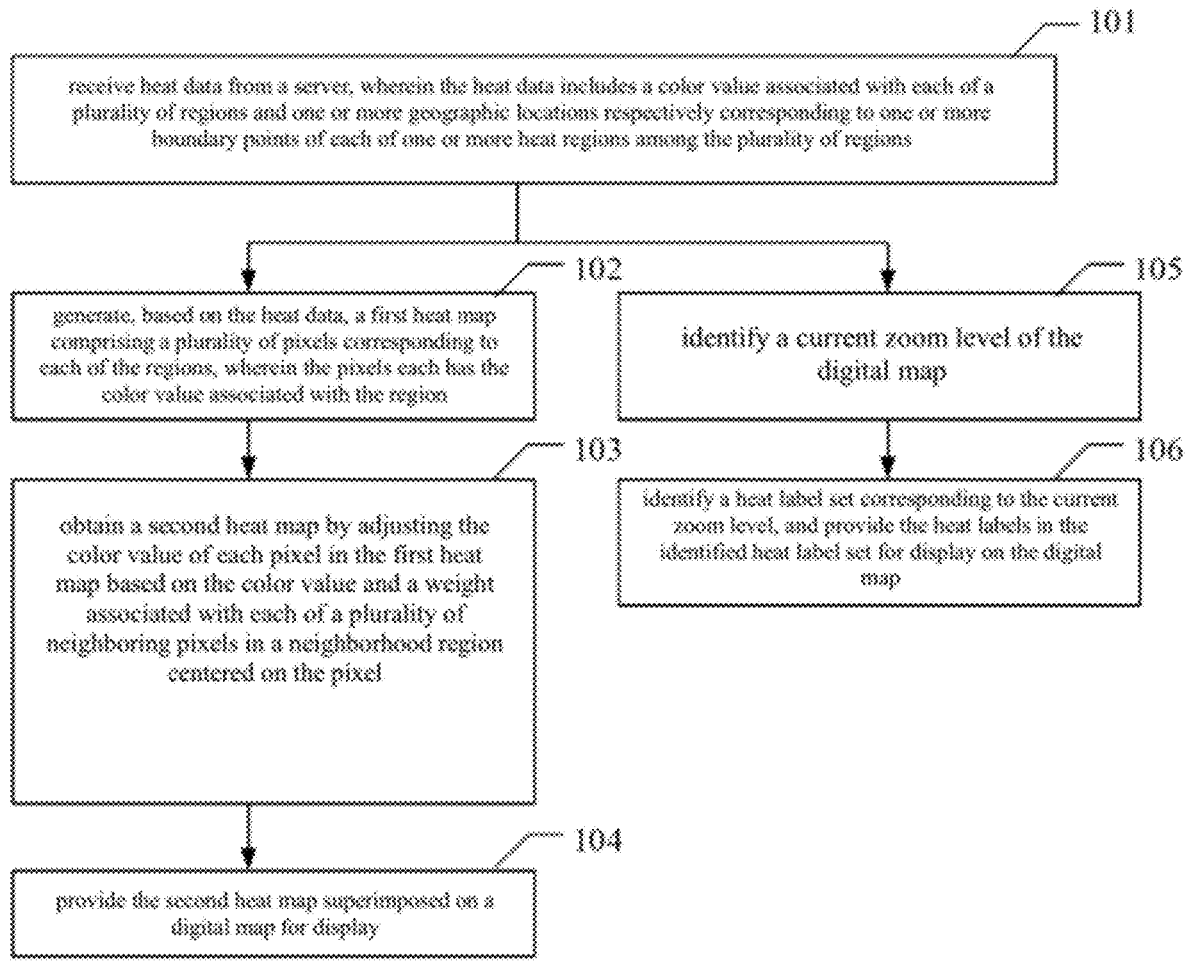
FIG. 1 shows a flowchart illustrating a computer-implemented heat map displaying method.

FIG. 1 shows a flowchart illustrating a computer-implemented heat map displaying method. Referring to FIG. 1, this heat map displaying method may include the following steps.

At step 101, a computing device (e.g., a client) may receive heat data from a server. The heat data may comprise a color value associated with each of a plurality of regions and one or more geographic locations respectively corresponding to one or more boundary points of each of one or more heat regions among the plurality of regions. In some embodiments, the heat data may represent information, such as a distribution of requested service, population, or vehicle density, in the heat regions.

Before being sent to a client, the heat data may be processed by the server to include a color value associated with each of the plurality of regions and one or more geographic locations respectively corresponding to one or more boundary points of each of one or more heat regions among the plurality of regions. The heat regions may be selected by the server from the plurality of regions by, for example, selecting those regions whose heat values are larger than a threshold.

The geographic locations of the boundary points of a heat region may identify its coverage area. They may be represented by latitude and longitude coordinates of the boundary points. The server may send an identifier of each heat region and latitude and longitude coordinates of the boundary points of the heat region to the client, so that the coverage area of the heat region may be identified by the client.

A color value associated with each heat region may be derived based on the heat value of the heat regions. The heat value of a heat region represents information such as distribution or density of an item of interest within the heat region. For example, the heat value of a heat region may represent a distribution of requested service in that heat region. A color in the red end of the spectrum may be used to represent a high heat value, and a color in the blue end of the spectrum may be used to represent a low heat value.

The heat values of the heat regions may also be sent to the client in a form of heat label sets, which may be used by the client to label the heat values of the heat regions.

At step 102, the computing device may generate, based on the heat data, a first heat map. The first heat map may comprise a plurality of pixels corresponding to each of the regions, wherein the pixels each has the color value associated with the region.

Figure 2:
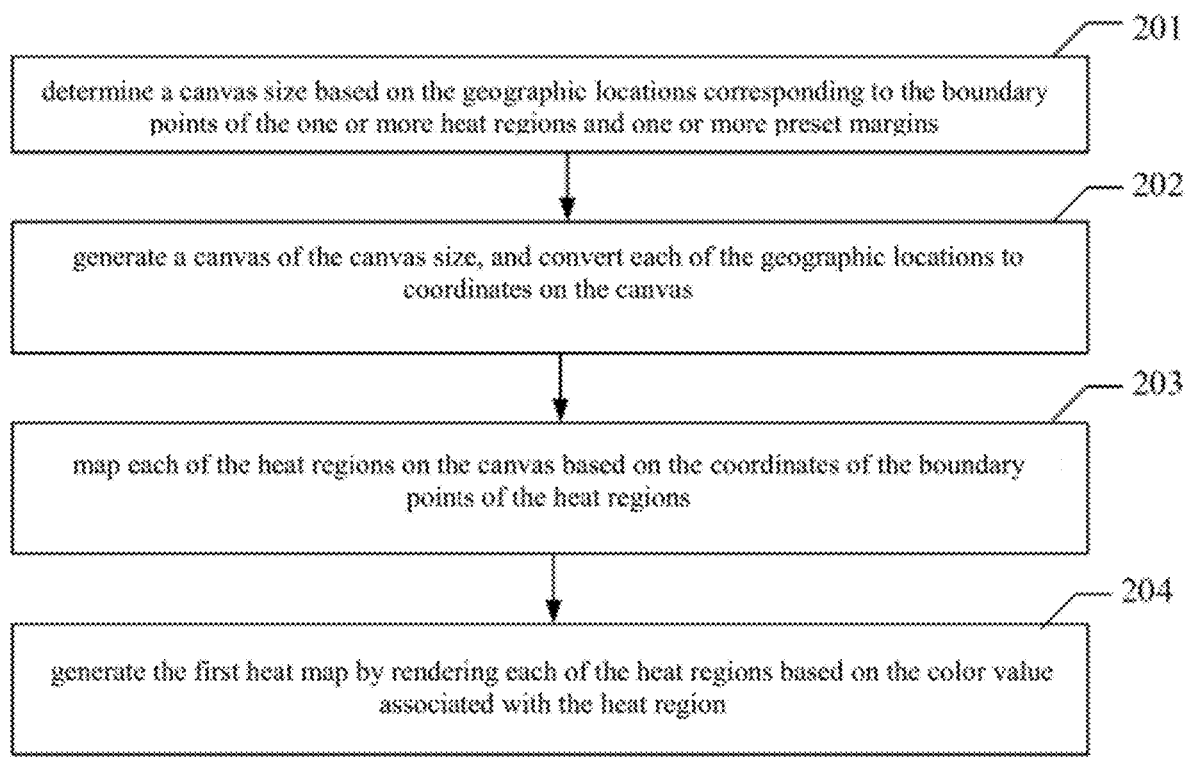
FIG. 2 shows a flowchart illustrating a process to generate a first heat map.

FIG. 2 shows a flowchart illustrating a process to generate a first heat map. In some embodiments, the process to generate the first heat map may include the following steps.

At step 201: the computing device may determine a canvas size based on the geographic locations corresponding to the boundary points of the one or more heat regions and one or more preset margins. The canvas size may refer to a size of a display area for displaying all the heat regions. The canvas may refer to an area for displaying a heat map.

At step 202: the computing device may generate a canvas of the canvas size and convert each of the geographic locations to coordinates on the canvas.

At step 203: each of the heat regions may be mapped on the canvas based on the coordinates of the boundary points of each of the heat regions.

At step 204: the first heat map may be generated by rendering each of the heat regions based on the color value associated with the heat region.

In some embodiments, the client may first identify an identifier for each heat region, and the corresponding latitude and longitude coordinates of the boundary points. Through these latitude and longitude coordinates, boundary coordinates of each heat region may be identified. Then, an area that encompasses all the heat regions may be determined, based on which a canvas size may be determined.

For example, for each heat region, the boundary coordinates on four directions (i.e., boundary coordinates corresponding to maximum longitude on the east, minimum longitude on the west, maximum latitude on the north, and minimum latitude on the south) may first be identified. Then, a minimum bounding rectangle for this heat region may be determined. Here, a minimum bounding rectangle of a region may refer to the smallest possible rectangle that can completely encompass that region. After the minimum bounding rectangles for all the heat regions are determined, a basic canvas size may be determined based on the sizes of these minimum bounding rectangles and a zoom level.

After the basic canvas size is determined, the outer edge of the coverage area may be further extended by preset margins to reach a canvas size. The margins may be needed to preserve spaces for subsequent blurring process.

After the canvas size is determined, a canvas of the canvas size may be generated. Based on a selected zoom level, the geographic positions of the boundary points of the heat regions may be converted into coordinates on the canvas. Each of the heat regions may be mapped to the canvas based on the coordinates of the boundary points. For example, the first heat map may be generated by first mapping the minimum bounding rectangles for the heat regions on the canvas, and then rendering each minimum bounding rectangle with a color value associated with the heat region being encompassed by the minimum bounding rectangle. Other suitable methods may also be used to generate the first heat map.

At step 103 of the method illustrated in FIG. 1, the computing device may obtain a second heat map by adjusting the color value of each pixel in the first heat map based on the color value and a weight associated with each of a plurality of neighboring pixels in a neighborhood region centered on the pixel. A pixel's neighboring pixels may refer to pixels in a neighborhood centered on that pixel.

In this step, after the first heat map is generated, the first heat map may go through a blurring process to smooth the boundary characteristics of the heat regions. For example, the blurring process may be implemented using a Gaussian Blur algorithm. The algorithm may be implemented by the following steps.

Figure 3:
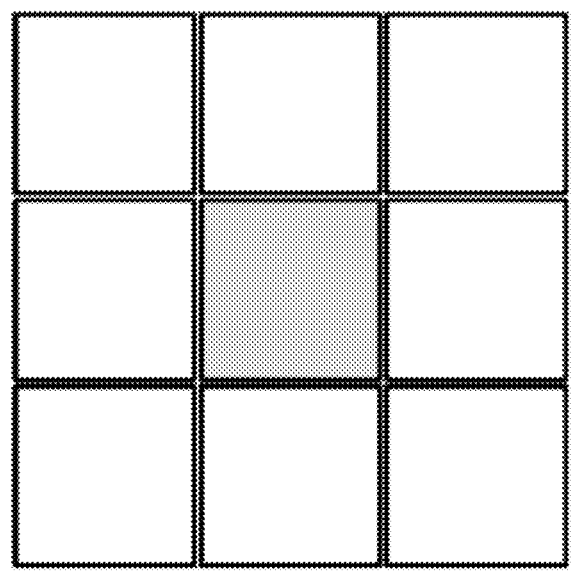
FIG. 3 shows a diagram illustrating a neighborhood region.

First, each pixel in the first heat map may be visited. For each visited pixel P, a neighborhood region centered on the pixel P may be determined. FIG. 3 shows a diagram illustrating a neighborhood region centered on a visited pixel (shaded pixel). As shown in FIG. 3, if a blurring radius is set at one pixel, the neighborhood region centered on the visited pixel may include a total of nine pixels, with the visited pixel on the center of the neighborhood region.

Next, for each pixel within the neighborhood region, a weight can be calculated based on its coordinates within the neighborhood region. The weights for all the pixels within the neighborhood region may form a weight matrix. The weight for a pixel within the neighborhood region may be computed by the Gaussian function:

$$G(x, y) = \frac{1}{2\pi\sigma^2} e^{-(x^2+y^2)/2\sigma^2}$$

Wherein $G(x, y)$ is the weight of a pixel within the neighborhood region, x and y is the horizontal and vertical coordinate of the pixel in the neighborhood region, respectively, and $\sigma$ is a pre-determined constant.

After the weight matrix is computed, a current color value for each pixel in the neighborhood region may be obtained by multiplying the color value of the neighboring pixel with the weight associated with the neighboring pixel. Then the adjusted color value of the visited pixel P will be set by setting the color value of the pixel P as a sum of the current color values of all the neighboring pixels in the neighborhood region.

A second heat map may be obtained by adjusting the color values for all the pixels in the first heat map using the aforementioned Gaussian Blur algorithm. After the blurring process, the boundary characteristics of the heat regions in second heat map may be smoothed. The heat regions in the processed heat map (the second heat map) may have blurred edges, and the color values at the heat regions may change more smoothly than those in the original heat map (the first heat map). That allows information, especially those at the boundary of the heat regions, to be more accurately represented.

At step 104, the second heat map is provided for display. The second heat map may be superimposed on a digital map.

In this step, after the second heat map is generated, the second heat map may be superimposed to a digital map based on the geographic locations of the boundary points of the heat regions. Then the digital map with the second heat map superimposed may be displayed to the client to convey the heat information on various geographic areas.

In some embodiments, in addition to displaying the second heat map represented by different colors, several heat labels each corresponding to a heat value of a heat region may also be displayed on the map.

In some embodiments, the heat data sent by the server may further comprise a plurality of heat label sets. Each of the heat label sets may correspond to one of a plurality of zoom levels. Each of the heat label sets may comprise one or more heat labels. Each of the one or more heat labels may indicate a heat value associated with a corresponding heat region.

Referring to FIG. 1, in some embodiments, the client, after receiving the heat data from the server as described in step 101, may further perform steps 105 through 106.

At step 105: a current zoom level of the digital map may be identified.

At step 106: a heat label set corresponding to the current zoom level may be identified, and the heat labels in the identified heat label set may be provided for display on the digital map.

Typically, when a user browses a map, the user might frequently change the zoom level of the map to view the information in different scales. Therefore in some embodiments, the client may identify a current zoom level of the original map, identify a heat label set corresponding to the current zoom level, and provide the heat labels in the identified heat label set for display on the digital map. Additionally, by monitoring the zoom level of the digital map, the client may detect an updated current zoom level, and provide, for display on the digital map, the heat labels in a heat label set corresponding to the updated current zoom level.

Heat label sets corresponding to different zoom levels may include different number of heat labels. For example, there may have N different zoom levels (N being a positive integer), named level 1 to level N, for a digital map. A larger zoom number represents a larger amplification degree, that is, a more detailed display, of the digital map. A heat label set corresponding to a higher zoom level may include more heat labels than a heat label set corresponding to a smaller zoom level, that allows heat values of the heat regions to be displayed in finer detail in a more detailed map display. On the other hand, a smaller zoom number represents a smaller amplification degree of the digital map. A heat label set corresponding to a smaller zoom level may include fewer heat labels since the heat regions, displayed in a larger scale, in the digital map can be sufficiently represented by only a small number of heat labels.

In some embodiments, each heat label may correspond to a geographic region in the digital map to show a heat value of this geographic region. When displaying heat labels on the digital map, displaying locations of the heat labels may be determined based on the geographic region that each of the heat labels corresponds to.

In the embodiments described above, by adjusting the color value for each pixel in the first heat map, boundary characteristics of the heat regions may be smoothed. The heat regions in processed heat map (the second heat map) may have more blurred edges than their counterparts in the original heat map (the first heat map). Thus the service request information may be more accurately represented in the second heat map. This method addresses the issues of conventional techniques that service request information may be misrepresented due to abrupt changes in color values across neighboring heat regions. Additionally, this method may identify a current zoom level of the digital map and a heat label set corresponding to the current zoom level and provide the heat labels in the identified heat label set for display on the digital map. That provides a user an intuitive way to observe a heat value for each regions.

In some embodiments, the service scenarios may include online ride-hailing service, online meal ordering service, etc. In the service scenarios described below, heat data may be used to represent the distribution of service demands in different geographic regions. Persons of ordinary skill in this field can apply the general principles disclosed herein to other embodiments and applications without departing from the spirit and scope of this application.

Before describing detail embodiments on different service scenarios, a network environment associated with an information exchange and synchronization system for these service scenarios is described first.

Figure 4:
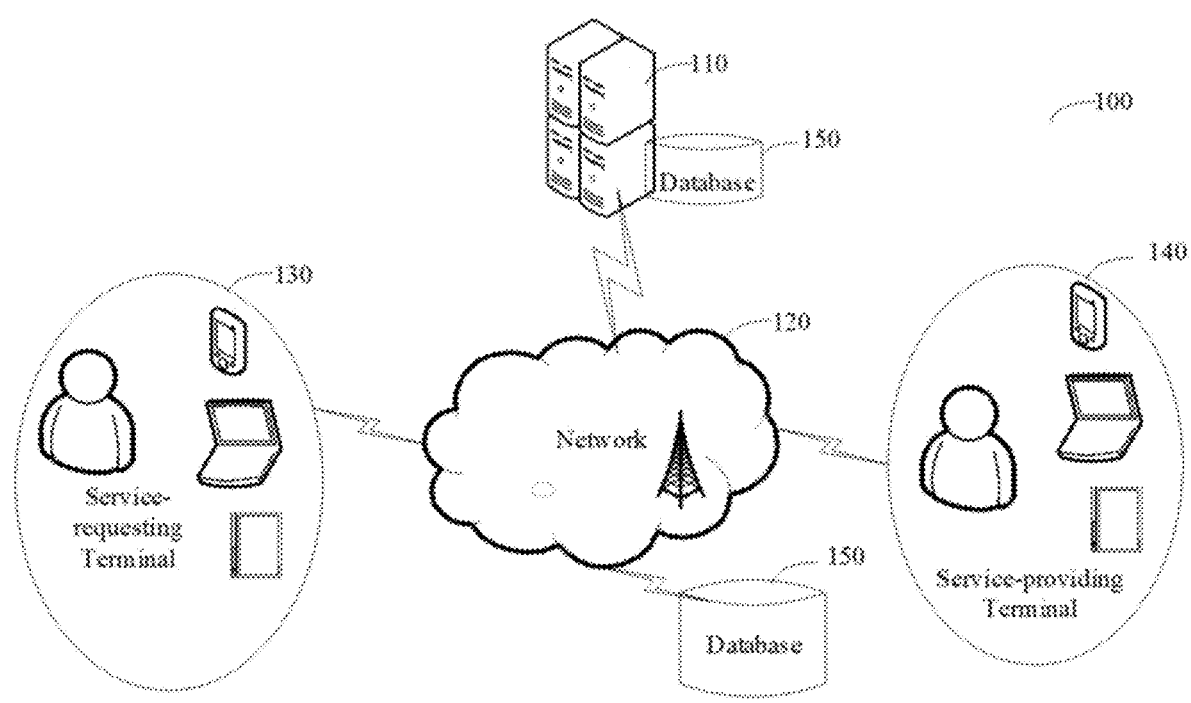
FIG. 4 shows a diagram illustrating a network environment associated with an information exchange and synchronization system.

FIG. 4 shows a diagram illustrating a network environment associated with an information exchange and synchronization system. The information exchange and synchronization system may be used for transportation services including, for example, taxi service, driving service, fast-ride service, ride-sharing service, bus service, driver rental, shuttle service, other suitable transportation services, any combination thereof, or online platforms offering one or more of the transportation services. Referring to FIG. 4, the system may include one or more of servers 110, networks 120, service-requesting terminals 130, service-providing terminals 140 and databases 150. The server 110 may include one or more processors that execute instructions.

In some embodiments, the server 110 may be a single server or a server group. The server group may be centralized or distributed (e.g., the server 110 may be a distributed system). In some embodiments, the server 110 may be local or remote relative to a terminal. For example, the server 110 may access information and/or data stored in the service-requesting terminal 130, the service-providing terminal 140, the database 150, or any combination thereof via a network 120. In some embodiments, the server 110 may be implemented on a cloud platform. As an example, a cloud platform may comprise a private cloud, a public cloud, a mixed cloud, a community cloud, a distributed cloud, an inter-cloud, and multi-clouds, or any combination thereof. In some embodiments, the server 110 may be implemented on an electronic device comprising one or more components.

In some embodiments, the server 110 may comprise a processor. The processor may process information and/or data related to a service request, so as to execute one or more functions described herein. In some embodiments, the processor may comprise one or more processing cores (e.g., a single-core processor (S) or a multi-core processor (S)). As an example, the processor can comprise Central Processing Unit (CPU), Application Specific Integrated Circuit (ASIC), Application Specific Instruction-set Processor (ASIP), Graphics Processing Unit (GPU), Physics Processing Unit (PPU), Digital Signal Processor (DSP), Field Programmable Gate Array (FPGA), Programmable Logic Device (PLD), controller, microcontroller unit, Reduced Instruction Set Computing (RISC), micro-processor, another suitable component, or any combination thereof.

The network 120 may be used for information or data exchange. In some embodiments, one or more components (e.g., server 110, service-requesting terminal 130, service-providing terminal 140, database 150) of the system may send information or data to other components. For example, the server 110 may obtain service requests from the service-requesting terminal 130 via the network 120.

In some embodiments, one or more components of the system (e.g., server 110, service-requesting terminal 130, service-providing terminal 140) may have access to the database 150. In some embodiments, when certain conditions are met, one or more components of the system may read or modify information associated with the service-requesting terminal 130, the service-providing terminal 140, public information, or any combination thereof. As an example and not by way of limitation, the server 110 may be enabled to read or modify the information of one or more users after receiving a service request. As another example and not by way of limitation, the service-providing terminal 140 can access information associated with a service requester when receiving a service request from the service-requesting terminal 130, but the service-providing terminal 140 may not be able to modify the information associated with the service-requesting terminal 130.

In some embodiments, information exchange among one or more components of the information exchange and synchronization system can be achieved by requesting service. An object of the service request may be vehicle status information of a vehicle in synchronization.

Figure 5:
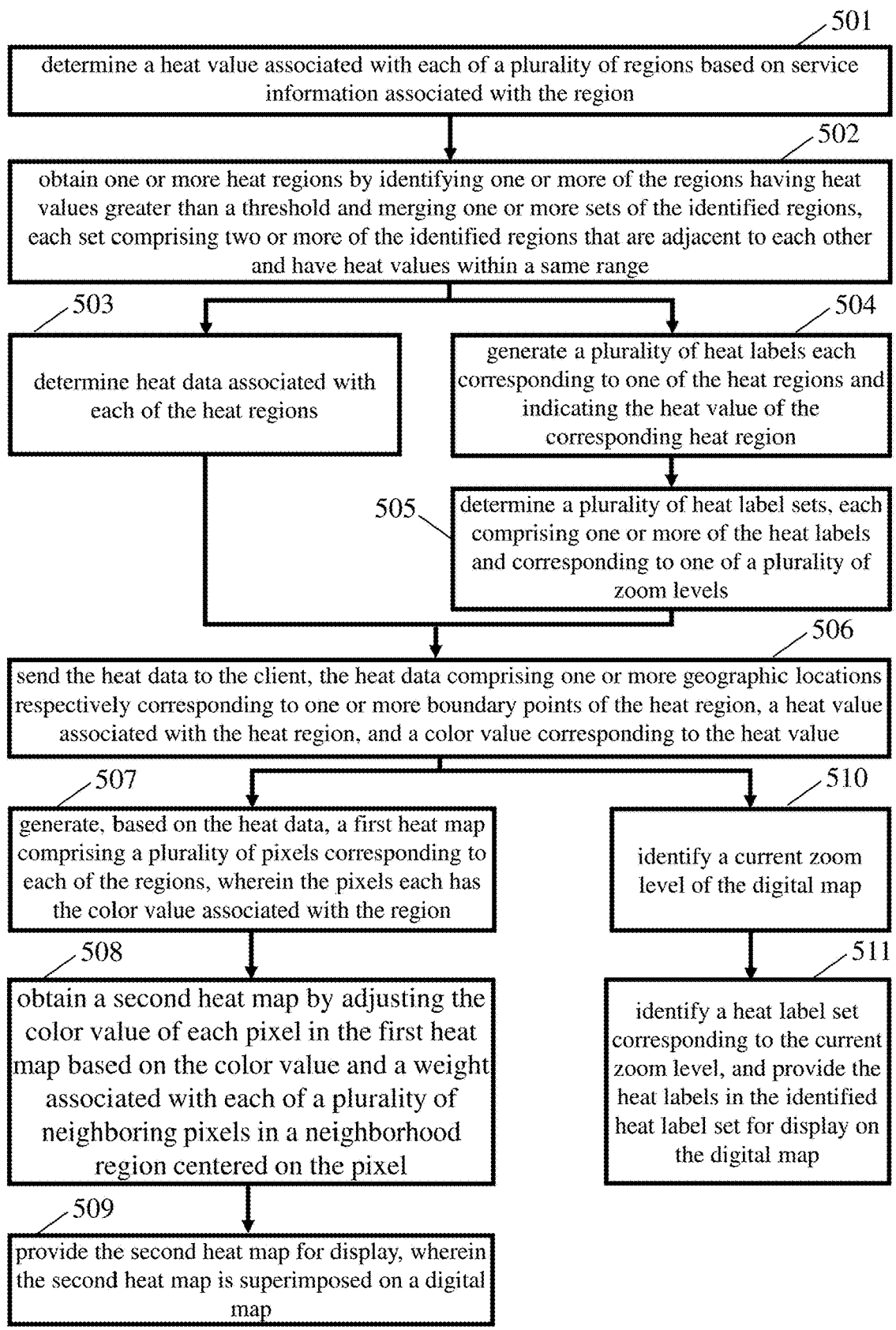
FIG. 5 shows a flowchart illustrating interactions between a server and a client.

FIG. 5 shows a flowchart illustrating interactions between a server and a client. A client may be a service-provider. Referring to FIG. 5, interaction between a server and a client (e.g., a service-provider) may include the following steps.

At step 501: a server may determine a heat value associated with each of a plurality of regions based on service information associated with the region.

In some embodiments, the server may determine the heat value based on a number of service-requesting terminal and a number of service-providing terminals within the region. The heat value may indicate a distribution of service resources within the region.

For example, the number of service-requesting terminals may be the number of service requesters who send service requests within a certain period of time, and the number of service-providing terminals may be the number of service providers that can receive the service requests and provide the requested services within a certain period of time. For example, for an online ride-hailing service, a service requester may be a passenger terminal, and a service provider may be a driver terminal. A heat value of a region may be determined by the number of the passenger terminals requesting the ride service and the number of the driver terminals waiting for orders in the region. If the number of the driver terminals waiting for orders is small and the number of the passenger terminals requesting the ride service is large in a region, the heat value of the region may be high, indicating a surplus of distributable service resources. Otherwise, if the number of the driver terminals waiting for orders is large and the number of the passenger terminals requesting the ride service is small in a region, the heat value of the region is low, indicating that a lack of distributable service resources.

Additionally, a region's heat value may be further adjusted for business or operational purposes. For example, for an online ride-hailing service, the heat value of a particular region may be increased to encourage more drivers to move to that region to increase the transportation capacity of that region. Other suitable adjustment strategies can also be adopted.

At step 502: the server may obtain one or more heat regions by identifying one or more of the regions having heat values greater than a threshold and merging one or more sets of the identified regions. Each set comprises two or more of the identified regions that are adjacent to each other and have heat values within a same range.

In some embodiments, the selection criterion for the heat regions may be determined according to actual demands. For example, for the distribution of service resources, if the number of service requesters and the number of service providers in a certain region are substantially equal in a region, the heat value at that region may be small, and the region may not be identified as a heat region (therefore the distribution of the service resources in that region may not be shown). On the other hand, if the number of service requesters is greater than the number of service providers in a region, the heat value of that region may be large, and the region may be identified as a heat region.

Some heat regions may have same or substantially same heat values. To facilitate subsequent processing of the heat data on a client, two or more heat regions that are adjacent to each other and have heat values within a same range may be merged. The threshold and the range may be determined based on actual requirements.

At step 503, the server may determine heat data associated with each of the heat regions. The heat data may comprise one or more geographic locations respectively corresponding to one or more boundary points of the heat region, a heat value associated with the heat region, and a color value corresponding to the heat value.

For example, the determining heat data associated with each of the heat regions may comprise: setting longitude and latitude coordinates associated with a boundary of the heat region in a plurality of directions as the geographic positions respectively corresponding to the boundary points of the heat region; and, if the heat region is obtained by merging a set of the identified regions, setting the heat value of the heat region as a weighted sum of the heat values of the identified regions in the set.

In some embodiments, after step 502, step 504 and step 505 may be performed.

At step 504: the server may generate a plurality of heat labels each corresponding to one of the heat regions and indicating the heat value of the corresponding heat region.

At step 505: the server may determine a plurality of heat label sets. Each of the heat label sets may comprises one or more of the heat labels and may correspond to one of a plurality of zoom levels.

Descriptions related to the heat labels and the heat label sets corresponding to different zoom levels are similar to those for step 105 and step 106 in FIG. 1, and therefore are not repeated here for the purpose conciseness and convenience.

At step 506: the server may send the heat data to the client. For each heat region, the heat data may comprise one or more geographic locations respectively corresponding to one or more boundary points of the heat region, a heat value associated with the heat region, and a color value corresponding to the heat value.

In some embodiments, the heat data may further comprise a plurality of heat label sets. Each of the heat label sets may correspond to one of a plurality of zoom levels. Each of the heat label sets may comprise one or more heat labels. Each of the one or more heat labels may indicate a heat value associated with a corresponding heat region.

In some embodiments, the server may determine a service status of the client. In some embodiments, the server may send the heat data to the client after each time interval of a preset length if the service status is a standby status. In some embodiments, the server may send the heat data to the client immediately if the service status of the client is changed from an order-completed status to the standby status.

At step 507, a client (e.g., a device associated with a service provider) may generate, based on the heat data, a first heat map comprising a plurality of pixels corresponding to each of the regions. Each of the pixels may have the color value associated with the region.

At step 508, a second heat map may be obtained by adjusting the color value of each pixel in the first heat map based on the color value and a weight associated with each of a plurality of neighboring pixels in a neighborhood region centered on the pixel. A pixel's neighboring pixels may refer to the pixels within a neighborhood region centered on that pixel, and a pixel's neighborhood region may refer to a surrounding region, such as a 3×3 region, of the pixel.

At step 509, the second heat map may be provided for display. The second heat map may be superimposed on a digital map.

If the heat data further comprises a plurality of heat label sets each corresponding to one of a plurality of zoom level, and each of the heat label sets comprises one or more heat labels each indicating a heat value associated with a corresponding heat region, then the step 510 through step 511 may be conducted.

At step 510, the client may identify a current zoom level of the digital map.

At step 511, the client may identify a heat label set corresponding to the current zoom level and provide the heat labels in the identified heat label set for display on the digital map.

Detailed procedures for these two steps are similar to those described for FIG. 1, and therefore are not repeated here for the purpose conciseness and convenience.

In the embodiments described above, by processing the heat data on the heat regions and adjusting the color value for each pixel in the first heat map, boundary characteristics of the heat regions may be smoothed. The heat regions in the processed heat map (the second heat map) may have more blurred edges than their counterparts in the original heat map (the first heat map), thus the service request information may be more accurately represented. This method addresses the issues of conventional techniques that service request information may be misrepresented due to abrupt changes in color values across neighboring heat regions.

Corresponding to the aforementioned heat map displaying method, the specification further provides a heat map displaying device. Due to the similar principles between the heat map displaying device and the aforementioned heat map displaying method, details implementation of the device may be included in the implementation of the methods described above, thus those descriptions are omitted herein.

Figure 6:
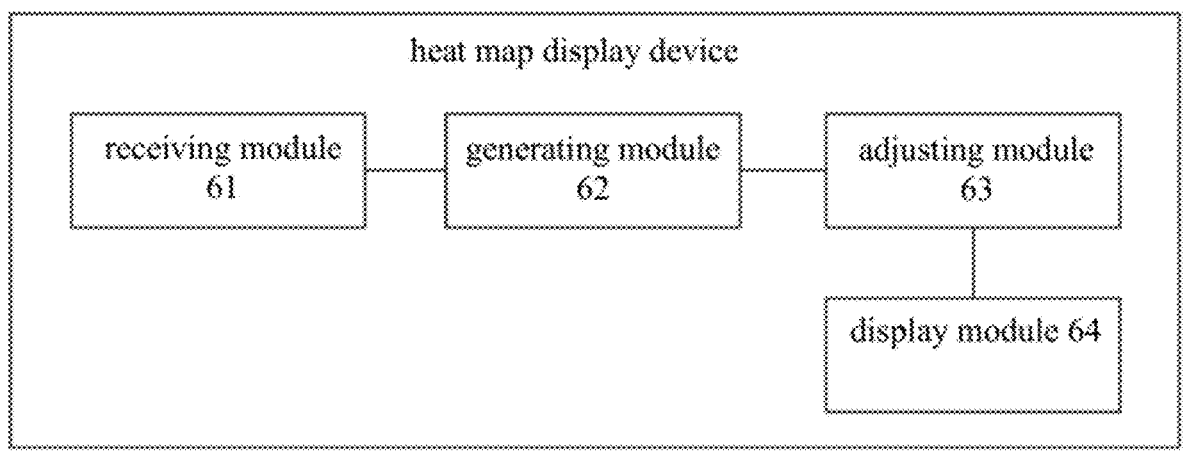
FIG. 6 shows a schematic diagram illustrating a heat map displaying device.

FIG. 6 shows a schematic diagram illustrating a heat map displaying device.

Referring to FIG. 6, the heat map displaying device 60 may comprise a receiving module 61 configured to receive heat data from a server, wherein the heat data comprises a color value associated with each of a plurality of regions and one or more geographic locations respectively corresponding to one or more boundary points of each of one or more heat regions among the plurality of regions, a generating module 62 configured to generate, based on the heat data, a first heat map comprising a plurality of pixels corresponding to each of the regions, wherein the pixels each has the color value associated with the region, an adjusting module 63 configured to obtain a second heat map by adjusting the color value of each pixel in the first heat map based on the color value and a weight associated with each of a plurality of neighboring pixels in a neighborhood region centered on the pixel, and a display module 64 configured to provide the second heat map for display, wherein the second heat map is superimposed on a digital map.

In some embodiments, the heat data may further comprise a plurality of heat label sets. Each of the heat label sets corresponds to one of a plurality of zoom levels. Each of the heat label sets comprises one or more heat labels. Each of the one or more heat labels indicates a heat value associated with a corresponding heat region.

In some embodiments, after providing the second heat map for display, the display module 64 may be further configured to identify a current zoom level of the digital map, identify a heat label set corresponding to the current zoom level, and provide the heat labels in the identified heat label set for display on the digital map.

In some embodiments, the display module 64 may be further configured to detect an updated current zoom level, and provide, for display on the digital map, the heat labels in a heat label set corresponding to the updated current zoom level.

In some embodiments, when generating the first heat map, the generating module 62 may be configured to determine a canvas size based on the geographic locations corresponding to the boundary points of the one or more heat regions and one or more preset margins and generate a canvas of the canvas size.

The generating module 62 may be further configured to convert each of the geographic locations to coordinates on the canvas, map each of the heat regions on the canvas based on the coordinates of the boundary points of the heat regions and generate the first heat map by rendering each of the heat regions based on the color value associated with the heat region.

In some embodiments, when adjusting the color value of each pixel, the adjusting module 63 may be configured to obtain a current color value by multiplying the color value of the neighboring pixel with the weight associated with the neighboring pixel for each neighboring pixel in the neighborhood region centered on the pixel, and to set the color value of the pixel as a sum of the current color values of all the neighboring pixels in the neighborhood region.

Operational procedures and implementations of the modules in the device may be similar to those disclosed in some of the aforementioned embodiments, therefore they are not repeated herein.

Corresponding to the aforementioned heat map providing method, the specification further provides a device for providing heat data. Due to the similar principles between the heat map providing device and the aforementioned heat map providing method, details implementation of the device may be referred to the implementation of the methods described above, and those descriptions are omitted herein.

Figure 7:
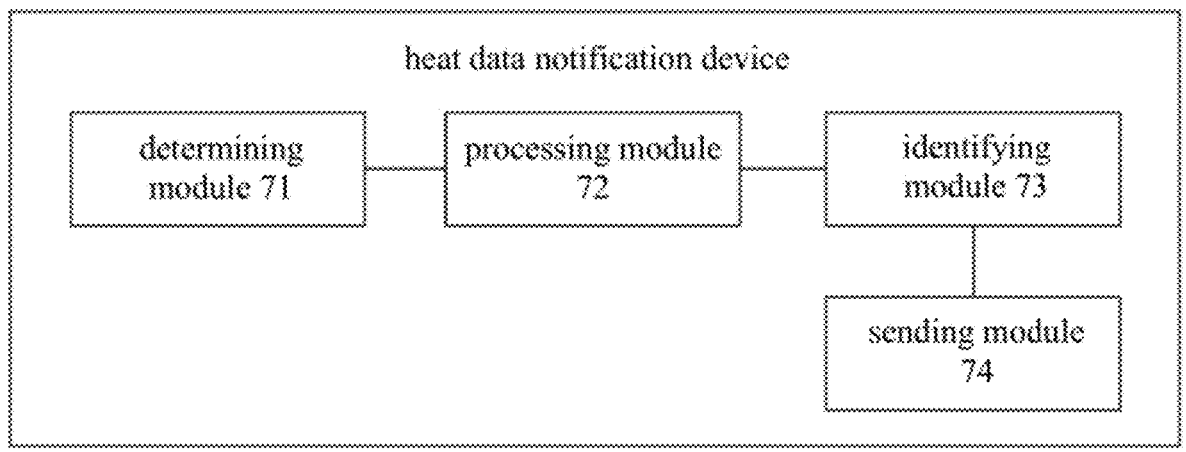
FIG. 7 shows a schematic diagram illustrating a device for providing heat data.

FIG. 7 shows a schematic diagram illustrating a device for providing heat data.

Referring to FIG. 7, the device for providing heat data 70 may comprise a determining module 71 configured to determine a heat value associated with each of a plurality of regions based on service information associated with the region, a processing module 72 configured to obtain one or more heat regions by identifying one or more of the regions having heat values greater than a threshold and merging one or more sets of the identified regions, each set comprising two or more of the identified regions that are adjacent to each other and have heat values within a same range, an identifying module 73 configured to determine heat data associated with each of the heat regions, the heat data comprising one or more geographic locations respectively corresponding to one or more boundary points of the heat region, a heat value associated with the heat region, and a color value corresponding to the heat value, and a sending module 74 configured to send the heat data to a client.

In some embodiments, when determining heat data associated with each of the heat regions, the identifying module 73 may be specifically configured to set longitude and latitude coordinates associated with a boundary of the heat region in a plurality of directions as the geographic positions respectively corresponding to the boundary points of the heat region, and, if the heat region is obtained by merging a set of the identified regions, set the heat value of the heat region as a weighted sum of the heat values of the identified regions in the set.

In some embodiments, after obtaining one or more heat regions, the processing module 72 may be further configured to generate a plurality of heat labels each corresponding to one of the heat regions and indicating the heat value of the corresponding heat region and determine a plurality of heat label sets. Each heat label set may comprise one or more of the heat labels and may correspond to one of a plurality of zoom levels.

In some embodiments, when sending the heat data to a client, the sending module 74 may be specifically configured to determine a service status of the client, send the heat data to the client after each time interval of a preset length if the service status is a standby status, or, send the heat data to the client immediately if the service status of the client is changed from an order-completed status to the standby status.

In some embodiments, when determining a heat value associated with each of a plurality of regions, the determining module 71 may be specifically configured to determine the heat value based on a number of service-requesting terminals and a number of service-providing terminals within the region. The heat value may indicate a distribution of service resources within the region.

Operational procedures and implementations of the modules in the device may be similar to those disclosed in some of the aforementioned embodiments, therefore they are not repeated herein.

Figure 8:
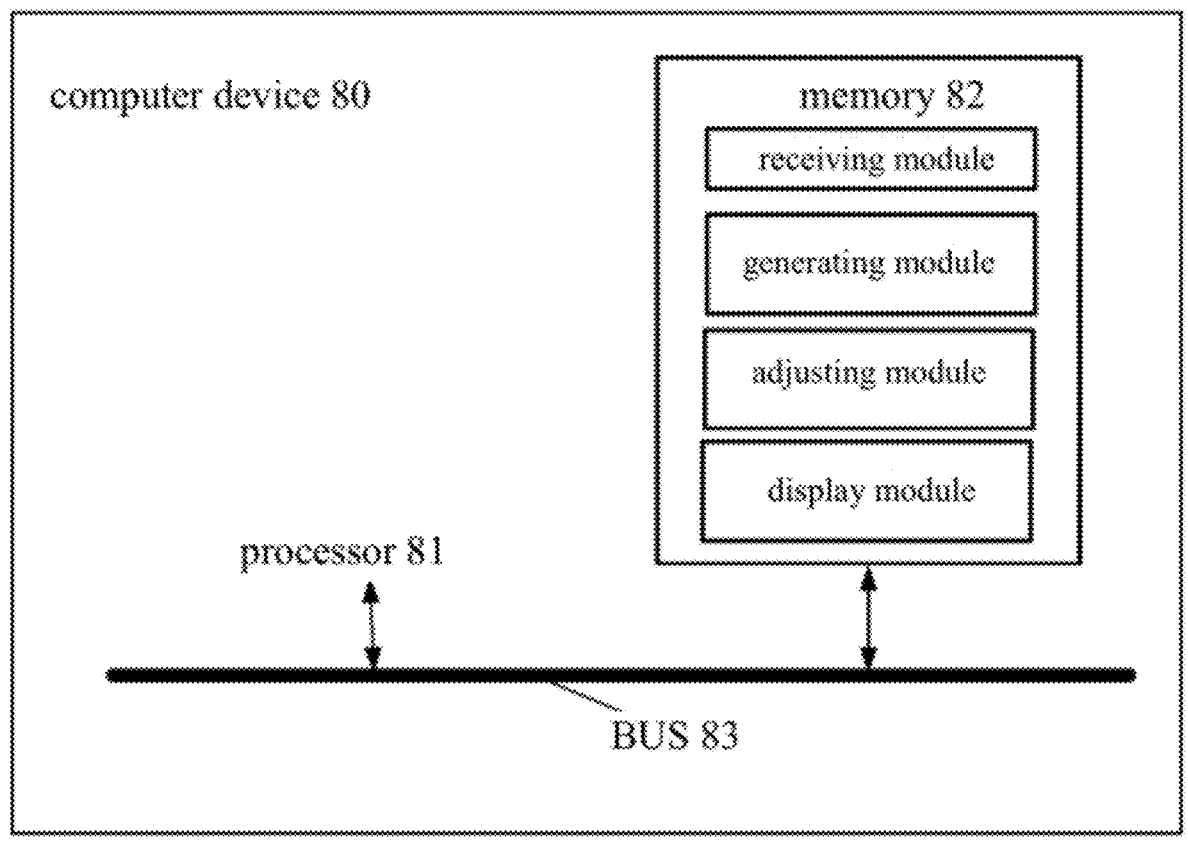
FIG. 8 shows a schematic diagram illustrating a computer device.

The specification further provides a computer device. FIG. 8 shows a schematic diagram illustrating a computer device.

Referring to FIG. 8, the computer device 80 may comprise a processor 81, a memory 82, and a computer BUS 83. The memory 82 may store computer-executable instructions (for example, executable instructions for executing the operations for the receiving module 61, the generating module 62, the adjusting module 63, and the display module 64, as shown in FIG. 6). The memory 82 may communicate with the processor 81 through the computer BUS 83. When the computer-executable instructions are executed by the processor 81, the computer device 80 may conduct operations.

The operations may include receiving heat data from a server. The heat data may comprise a color value associated with each of a plurality of regions and one or more geographic locations respectively corresponding to one or more boundary points of each of one or more heat regions among the plurality of regions.

The operations may also include generating, based on the heat data, a first heat map comprising a plurality of pixels corresponding to each of the regions, wherein the pixels each has the color value associated with the region, obtaining a second heat map by adjusting the color value of each pixel in the first heat map based on the color value and a weight associated with each of a plurality of neighboring pixels in a neighborhood region centered on the pixel, and providing the second heat map for display. The second heat map may be superimposed on a digital map.

Details of these processes are similar to those described in some of the aforementioned embodiments, and therefore are not repeated here.

Figure 9:
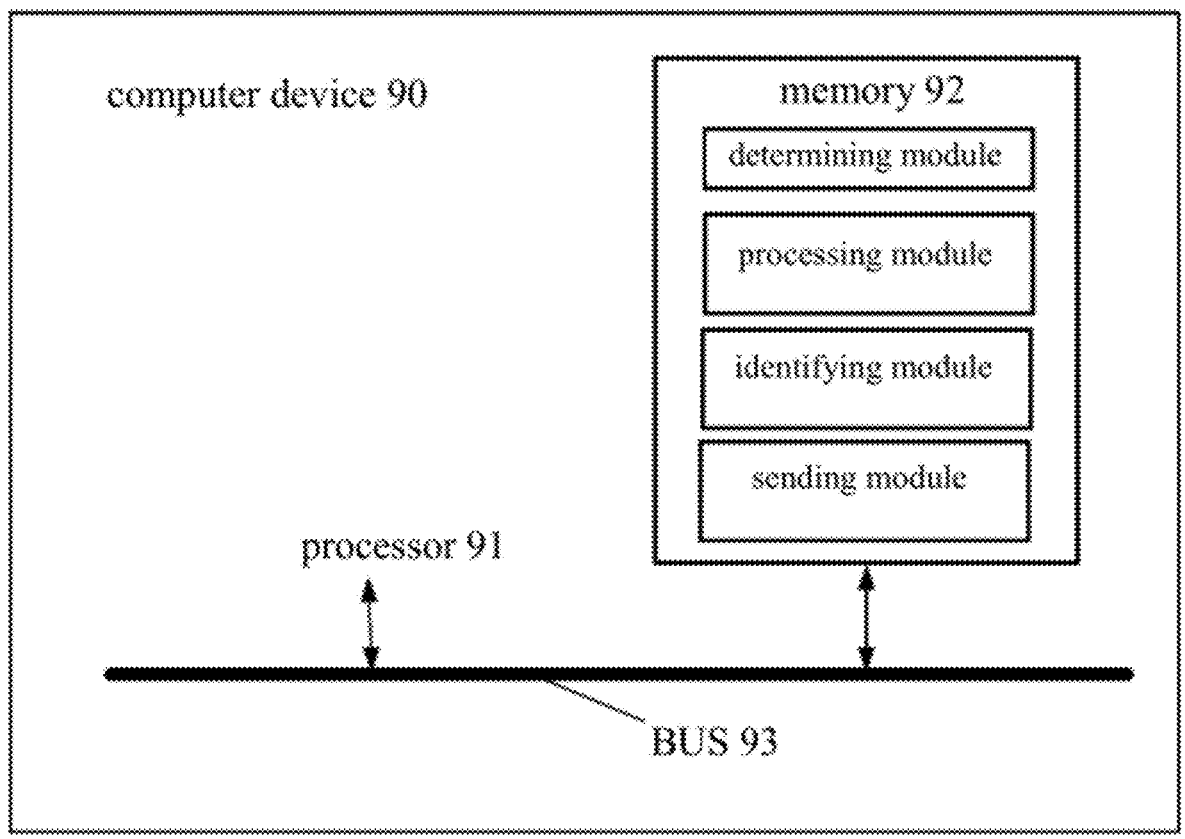
FIG. 9 shows a schematic diagram illustrating a computer device.

The specification further provides another computer device. FIG. 9 shows a schematic diagram illustrating a computer device.

Referring to FIG. 9, the computer device 90 may comprise a processor 91, a memory 92, and a computer BUS 93. The memory 92 may store computer-executable instructions (for example, executable instructions for executing the operations for the determining module 71, the processing module 72, the identifying module 73, and the sending module 74, as shown in FIG. 7). The memory 92 may communicate with the processor 91 through the computer BUS 93. When the computer-executable instructions are executed by the processor 91, the computer device 90 may conduct operations.

The operations may include determining a heat value associated with each of a plurality of regions based on service information associated with the region and obtaining one or more heat regions. The one or more heat regions may be identified by identifying one or more of the regions having heat values greater than a threshold and merging one or more sets of the identified regions. Each set may comprise two or more of the identified regions that are adjacent to each other and have heat values within a same range.

The operations may also include determining heat data associated with each of the heat regions. The heat data may comprise one or more geographic locations respectively corresponding to one or more boundary points of the heat region, a heat value associated with the heat region, and a color value corresponding to the heat value. The operations may further include sending the heat data to a client.

Details of these processes are similar to those described in some of the aforementioned embodiments, and therefore are not repeated here.

The specification further provides a computer-readable storage medium. The storage medium may store computer programs. When these computer programs are executed by one or more processors, the aforementioned heat map displaying method or the aforementioned heat data providing method may be conducted.

The storage medium may be a general-purpose storage medium such as a flash drive, a portable hard drive, ROM, RAM, a magnetic disk, an optical disc, another medium operable to store program code, or any combination thereof. When the computer programs stored in the storage medium are executed, the aforementioned heat data displaying method or heat data providing method may be conducted. In these methods, the heat regions are processed to have blurred edges, so that the color values of the heat regions may change more smoothly than those in the heat map of conventional methods. That allows information, especially those at the boundary of the heat regions, to be more accurately represented.

The specification further provides a computer product for a heat map displaying method. The product comprises storage medium with computer-executable instructions stored in it. When these computer-executable instructions are executed by one or more processors, the aforementioned heat map displaying method is conducted.

The specification further provides a computer product for a heat data providing method. The product comprises storage medium with computer-executable instructions stored in it. When these computer-executable instructions are executed by one or more processors, the aforementioned heat data providing method may be conducted.

One of ordinary skill in the art can understand details about the operation and processes of the system and apparatus described above by referring to corresponding processes in the method embodiments described above. In some embodiments, the division of the modules may be logical or functional. Alternative methods of division may be used. Multiple modules or components may be combined or integrated into another system. Some features may be omitted or not executed. The mutual coupling, direct coupling, or communication connection that is illustrated or discussed may be replaced by indirect coupling or communication connection through suitable communication interfaces, apparatuses, or modules, which may be electrical, mechanical, or in other suitable forms.

Each of the processes, methods, and algorithms described in the preceding sections may be embodied in, and fully or partially automated by, software or code modules executed by one or more computer systems or computer processors comprising computer hardware. The processes and algorithms may be implemented partially or wholly in application-specific circuitry.

The software or code modules may be implemented as separated sections or blocks of program code. One or more of the software or code modules may alternatively be integrated into one section or block of program code. When the functions disclosed herein are implemented in the form of software functional modules and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments disclosed herein. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method, comprising:
    obtaining, by one or more processors, heat data comprising a plurality of heat label sets respectively corresponding to a plurality of zoom levels, wherein each of the plurality of heat label sets comprises one or more heat labels;
    identifying, by the one or more processors, a current zoom level of a digital map from the plurality of zoom levels;
    identifying, by the one or more processors, a first heat label set from the plurality of heat label sets corresponding to the current zoom level;
    generating, by the one or more processors, a heat map comprising a plurality of pixels based on the one or more heat labels in the first heat label set, wherein the generating comprises:
        adjusting a color value for each of the plurality of pixels based on the color value and a weight associated with each of neighboring pixels in a neighborhood region centered on the pixel; and
    displaying, by the one or more processors, the heat map on the digital map.

2. The method of claim 1, further comprising:
    detecting, by the one or more processors, an updated current zoom level from the plurality of zoom levels; and
    identifying, by the one or more processors, a second heat label set from the plurality of heat label sets corresponding to the updated current zoom level; and
    displaying, by the one or more processors, second heat labels in the second heat label set on the digital map.

3. The method of claim 1, wherein the heat data further comprises a heat value associated with each of a plurality of regions and one or more geographic locations respectively corresponding to one or more boundary points of each of one or more heat regions among the plurality of regions.

4. The method of claim 3, wherein each of the one or more heat labels indicates the heat value associated with a corresponding heat region of the plurality of regions.

5. The method of claim 3, wherein obtaining the heat data comprises:
obtaining, by the one or more processors, the heat value associated with each of the plurality of regions based on service information associated with the region;
obtaining, by the one or more processors, one or more heat regions by identifying one or more of the regions having heat values greater than a threshold and merging the identified regions into one or more sets, each set comprising two or more of the identified regions that are adjacent to each other and have heat values within a same range; and
determining, by the one or more processors, the heat data associated with each of the heat regions.

6. The method of claim 5, wherein the heat data associated with each of the heat regions comprises the heat value associated with the heat region, and a color value corresponding to the heat value.

7. The method of claim 5, wherein the determining the heat data associated with each of the heat regions comprises:
setting, by the one or more processors, longitude and latitude coordinates associated with a boundary of the heat region in a plurality of directions as geographic positions respectively corresponding to the boundary points of the heat region; and
when the heat region is obtained by merging a set of the identified regions, setting, by the one or more processors, the heat value of the heat region as a weighted sum of the heat values of the identified regions in the set.

8. The method of claim 5, wherein the determining the heat value associated with each of a plurality of regions comprises:
determining, by the one or more processors, the heat value based on a number of service-requesting terminals and a number of service-providing terminals within the region, the heat value indicating a distribution of service resources within the region.

9. The method of claim 1, wherein obtaining the heat data comprises:
obtaining, by the one or more processors, a service status of a client;
when the service status is a standby status, obtaining, by the one or more processors, the heat data after each of a plurality of time intervals of a preset length; and
when the service status is changed from an order-completed status to the standby status, obtaining, by the one or more processors, the heat data immediately.

10. A system for displaying a heat map, comprising one or more processors and one or more non-transitory computer-readable memories coupled to the one or more processors and configured with instructions executable by the one or more processors to cause the system to perform operations comprising:
obtaining, by the one or more processors, heat data comprising a plurality of heat label sets respectively corresponding to a plurality of zoom levels, wherein each of the plurality of heat label sets comprises one or more heat labels;
identifying, by the one or more processors, a current zoom level of a digital map from the plurality of zoom levels;
identifying, by the one or more processors, a first heat label set from the plurality of heat label sets corresponding to the current zoom level;
generating, by the one or more processors, a heat map comprising a plurality of pixels based on the one or more heat labels in the first heat label set, wherein the generating comprises:
adjusting a color value for each of the plurality of pixels based on the color value and a weight associated with each of neighboring pixels in a neighborhood region centered on the pixel; and
displaying, by the one or more processors, the heat map on the digital map.

11. The system of claim 10, further comprising:
detecting, by the one or more processors, an updated current zoom level from the plurality of zoom levels; and
identifying, by the one or more processors, a second heat label set from the plurality of heat label sets corresponding to the updated current zoom level; and
displaying, by the one or more processors, second heat labels in the second heat label set on the digital map.

12. The system of claim 10, wherein the heat data further comprises a heat value associated with each of a plurality of regions and one or more geographic locations respectively corresponding to one or more boundary points of each of one or more heat regions among the plurality of regions.

13. The system of claim 12, wherein each of the one or more heat labels indicates the heat value associated with a corresponding heat region of the plurality of regions.

14. The system of claim 12, wherein obtaining the heat data comprises:
obtaining, by the one or more processors, the heat value associated with each of the plurality of regions based on service information associated with the region;
obtaining, by the one or more processors, one or more heat regions by identifying one or more of the regions having heat values greater than a threshold and merging the identified regions into one or more sets, each set comprising two or more of the identified regions that are adjacent to each other and have heat values within a same range; and
determining, by the one or more processors, the heat data associated with each of the heat regions.

15. The system of claim 14, wherein the heat data associated with each of the heat regions comprises the heat value associated with the heat region, and a color value corresponding to the heat value.

16. The system of claim 14, wherein the determining the heat data associated with each of the heat regions comprises:
setting, by the one or more processors, longitude and latitude coordinates associated with a boundary of the heat region in a plurality of directions as geographic positions respectively corresponding to the boundary points of the heat region; and
when the heat region is obtained by merging a set of the identified regions, setting, by the one or more processors, the heat value of the heat region as a weighted sum of the heat values of the identified regions in the set.

17. The system of claim 14, wherein the determining the heat value associated with each of a plurality of regions comprises:
determining, by the one or more processors, the heat value based on a number of service-requesting terminals and a number of service-providing terminals within the region, the heat value indicating a distribution of service resources within the region.

18. A non-transitory computer-readable storage medium configured with instructions executable by one or more processors to cause the one or more processors to perform operations comprising:
obtaining, by the one or more processors, heat data comprising a plurality of heat label sets respectively corresponding to a plurality of zoom levels, wherein each of the plurality of heat label sets comprises one or more heat labels;

identifying, by the one or more processors, a current zoom level of a digital map from the plurality of zoom levels;

identifying, by the one or more processors, a first heat label set from the plurality of heat label sets corresponding to the current zoom level;

generating, by the one or more processors, a heat map comprising a plurality of pixels based on the one or more heat labels in the first heat label set, wherein the generating comprises:
 adjusting a color value for each of the plurality of pixels based on the color value and a weight associated with each of neighboring pixels in a neighborhood region centered on the pixel; and displaying, by the one or more processors, the heat map on the digital map.

\* \* \* \* \*